July 8, 1952          E. J. GRIFFITHS          2,602,548
UNIT TYPE FILTER Filed Sept. 13, 1945                        6 Sheets-Sheet 1

INVENTOR
Edgar J. Griffiths
BY
Emery, Varney, Whittemore & Dix
ATTORNEYS July 8, 1952     E. J. GRIFFITHS     2,602,548
UNIT TYPE FILTER Filed Sept. 13, 1945     6 Sheets-Sheet 3

INVENTOR
Edgar J. Griffiths
BY
Emery Varney, Whittemore & Dix
ATTORNEYS

July 8, 1952  E. J. GRIFFITHS  2,602,548
UNIT TYPE FILTER

Filed Sept. 13, 1945  6 Sheets-Sheet 4

INVENTOR.
Edgar J. Griffiths
BY
Emery, Varney, Whittemore & Dix

July 8, 1952 E. J. GRIFFITHS 2,602,548
UNIT TYPE FILTER
Filed Sept. 13, 1945 6 Sheets-Sheet 5

INVENTOR.
Edgar J. Griffiths
BY
Emery, Varney, Whittemore, & Dix.

July 8, 1952  E. J. GRIFFITHS  2,602,548
UNIT TYPE FILTER

Filed Sept. 13, 1945  6 Sheets-Sheet 6

INVENTOR.
Edgar J. Griffiths
BY
Emery, Varney, Whittemore, & Dix

Patented July 8, 1952

2,602,548

UNITED STATES PATENT OFFICE 2,602,548

UNIT TYPE FILTER

Edgar J. Griffiths, Pittsburgh, Pa.

Application September 13, 1945, Serial No. 615,964

1 Claim. (Cl. 210—170)

This invention relates to filters and especially to filters of the type in which a number of plates are secured together to form a unit structure with filter elements secured between the plates. Such filters are made with fastening means that are easily releasable for dismantling the stack of plates so that the filter elements, usually discs or pads, can be replaced.

One object of this invention is to provide an improved construction for filters of the character described. More specific objects are to widen the field to which such filters are applicable, to reduce the cost of such filters by providing constructions that do not require such close manufacturing tolerances, and to improve the efficiency of such filters by providing inlet openings that promote circulation of the fluid over the filter pads.

Filters made up of stacks of plates with pads held between them have been used in the dairy, food, soft drink, and other industries where it is necessary to have a filter that can be dismantled conveniently and completely for thorough cleaning. Such filters have required plates made with close tolerances in order to clamp the filter element evenly and prevent leaks and by-passing, and the plates have had to be handled carefully to prevent denting or bending which would destroy the even clamping pressure around the edges. This invention increases the field of application for filters of the general type referred to by providing constructions in which resilient plates are used to clamp the filter elements or pads and in which the pressure for clamping is obtained by rigid confining elements above and below the stack of plates. Such a construction permits the use of plates that are lighter, made of different material than formerly, less liable to be dented in handling, and adapted to clamp the pads evenly without such close manufacturing tolerances because the stiffness of the plates is not relied upon to produce the clamping pressure.

This invention widens the field of application of filters, of the character indicated, to the field of air and gas filters, and filters for oil and various other fluids and also where it is advantageous to reduce velocity through the filter by providing large areas over which the filtering of the fluid is distributed.

Other features of the invention relate to a construction by which a filter unit can be used with a funnel by merely placing the filter unit in the funnel and without any connections. Other features relate to modifications of the construction for use with flexible inlets or outlets that permit ready removal or insertion of a filter unit in a tank, and for use in a sump such as that of a crankcase with provision for removal of the unit for replacement of filter pads.

Another object of the invention is to provide a stack-type filter in which plates surrounding a standpipe can be clamped together by cam means that eliminate the use of screw threads. With dairy filters that require very thorough cleaning this construction is particularly advantageous because screw threads are difficult to clean to the high standard required in a dairy filter.

Other objects relate to the construction of the plates used in stack-type filters for clamping the pads or discs. One feature relates to a plate construction that obtains a decreasing cross section, in the direction of fluid flow, of the space between the plate and the side of the filter pad from which the fluid flows through the pad, and a cross section of increasing area between the other side of the pad and the next plate below. Such a construction increases the capacity of the filter for a given height because it permits the plates to be positioned closer together without increasing the pressure drop through the filter. This is made possible by the fact that the cross sections of the spaces through which the fluid flows are approximately proportional to the volume of fluid at the different regions above and below the filter pad.

Another feature relates to a construction in which pressed metal plates are formed so as to partially nest for centering them with respect to one another. The invention obtains this centering effect while maintaining a construction that provides for adequate clamping of the inner and outer edges of the filter pads.

Several modifications of the invention provide different means for holding the filter pads spaced from the body portions of the plates between which the filter pads are clamped. These spacing means permit flow of fluid, especially liquid, with little obstruction and with an advantageous circulation of the fluid over the surface of the filter pads that increases the capacity of the filter for any particular pressure drop through the filter.

Other objects, features and advantages of the invention will appear or be pointed out as the specification proceeds.

In the drawings, forming a part hereof, in which like reference characters indicate corresponding parts in all the views.

Figure 1:
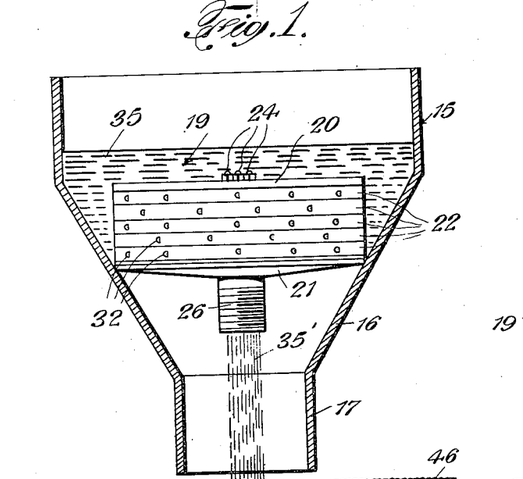
Figure 1 is a vertical sectional view through a funnel with a filter unit of this invention in position for filtering the liquid that flows through the funnel, the filter unit being shown in elevation.

Figure 1 shows a funnel 15 that is of circular cross section and that has a tapered side wall 16 connected at its lower edge with the discharge end or point 17 of the funnel. The discharge end 17 is of cylindrical form in Figure 1, but in funnel constructions this point portion is sometimes tapered, and may be corrugated. A filter unit 19 comprises a rigid disc or top plate 20 and another rigid disc or bottom plate 21 between which there are a number of filter plates 22. The plates 20 and 21 are held together by tension elements comprising stud bolts 24.

There is a pipe at the center of the plate 21 comprising an outlet connection 26 which is preferably an integral part of the plate 21. Within the opening through the pipe or outlet 26 there are bosses with threaded openings for receiving the stud bolts as will be explained fully in connection with Figure 5.

In the form of filter unit illustrated in Figure 1, the plates 20 and 21 are of substantially the same diameter as the filter plates 22 and the lower outside corner of the bottom plate 21 is recessed and contains an insert or packing ring 30. This ring 30 is made of rubber, or other packing material that is soft enough to be deformed by the weight of the filter unit 19 so that the ring 30 forms a liquid tight seal between the filter unit 19 and the sloping side wall 16 of the funnel. When the filter unit 19 is to be used with the funnel 15, therefore, it is sufficient to merely place the filter unit 19 in the funnel without any connections between the filter unit and the funnel. As more liquid is poured into the upper end of the funnel, the pressure deforming the sealing ring 30 becomes greater and the seal becomes tighter.

Fluid enters the filter unit through angularly spaced openings 32 in the outside rims of the filter plates 22. There is a filtering element or pad 34, preferably cloth, clamped between each of the filter plates 22 and its adjoining plate. Fluid entering the filter unit through the openings 32 flows through the filter pads 34 and out into a central opening in the filter, as will be explained more fully in connection with Figure 5. Liquid 35 placed in the funnel 15 flows through the filter unit 19 and discharges as a stream 35' through the outlet connection 26.

Figure 3:
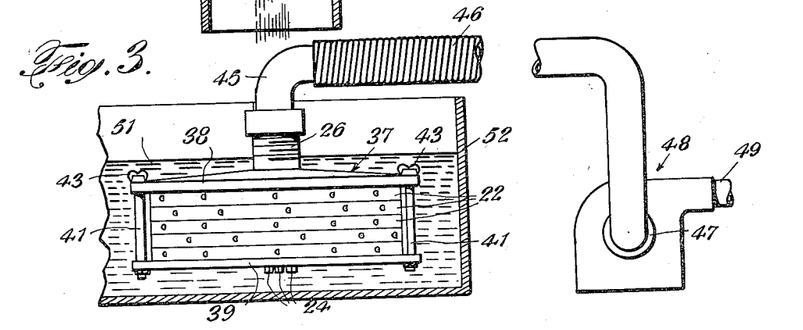
Figure 3 is a vertical sectional view showing a modified form of the filter unit of this invention connected with a flexible hose and inserted into a vessel from which liquid is to be withdrawn by suction pump, syphon or vacuum.

Figure 3 shows a filter unit 37 that is of similar construction to the unit 19 of Figure 1, except that it has upper and lower rigid plates 38 and 39 that extend beyond the filter plates 22 and are clamped together by tension elements comprising bolts 41 that fit into notches 42 (Figure 7) in the rigid backing-up plates 38 and 39. The bolts 41 are provided with wing nuts 43 for clamping the backing-up plates together.

The filter unit 37 of Figure 3 has its outlet connection 26 connected with a fitting 45 on the end of a flexible hose 46. The flexible hose connects with an inlet 47 of a pump 48 which discharges fluid to a conduit 49. The filter unit 37 is shown immersed in liquid 51 in a tank or vessel 52 from which the liquid is to be drawn by the pump 48 or other means. The filter unit 37, being connected with a flexible hose 46, can be inserted into any reservoir or vessel from which liquid is to be pumped, and all liquid drawn into the pump 48 and discharged into the conduit 49 will be filtered liquid regardless of the reservoir or tank from which it comes. The filter unit 37, with pads of proper mesh for the purpose, can be used as an air or gas filter. The filter of Figure 1 can be used in place of that shown in Figure 3.

Figure 2:
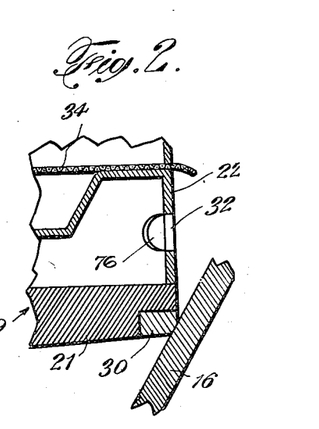
Figure 2 is an enlarged, fragmentary, sectional view through a portion of the filter unit shown in Figure 1.
Figure 4:
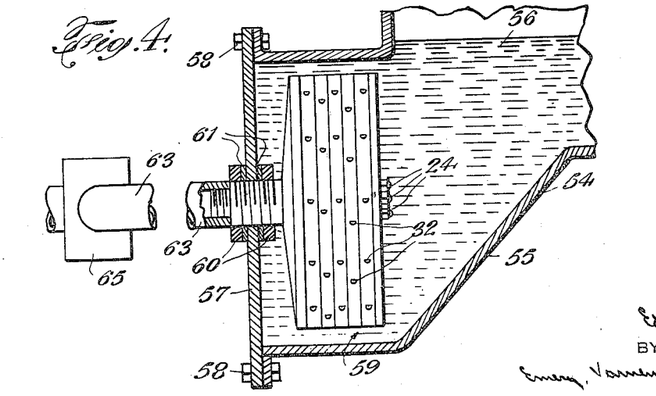
Figure 4 is a sectional view through a sump of a crankcase with the filter unit of this invention employed as an oil filter.

Figure 4 shows a crankcase 54 with a sump 55 into which drains oil 56. The side of the sump 55 is closed by a cover plate 57 secured in place by detachable fastening means comprising bolts 58. A filter unit 59, similar to the unit 19 of Figures 1 and 2, but without any sealing ring 30, has its outlet connection 26 extending through the cover plate 57 and held in place by clamping nuts 60 with washers 61 for insuring a liquid tight seal. The filter unit 59 is of a slightly smaller section than the sump 55 in which it is located so that there is space for oil around the entire circumference of the filter unit. Oil enters the openings 32 in the outside rims of the filter plates, flows through the filter unit 59, and out through the connection 26 which connects with piping 63 that leads to an oil pump 65 for recirculating the oil to an engine or other apparatus above the crankcase 54.

Figures 5, 6:
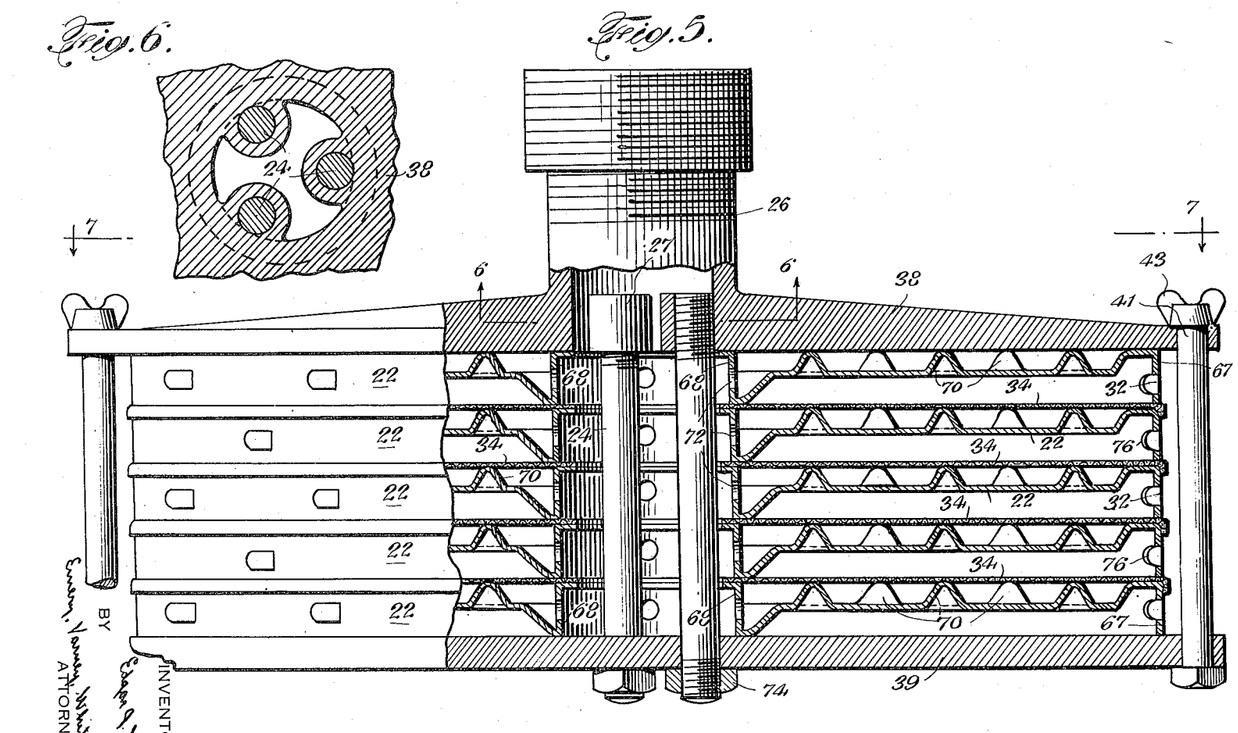
Figure 5 is an enlarged view, mostly in section, of a filter unit embodying this invention.
Figure 6 is a detail view taken on the line 6—6 of Figure 5.

Figure 5 is an enlarged view showing the inside construction of the filter unit 37 of Figure 3. Each of the filter plates 22 has an outside rim 67 and an inner rim 68. The body portion of the filter plate between the inner and outer rims is formed with discontinuous circular corrugations 70 which are shown in plan view in Figure 8. These corrugations 70 provide spaced supports for the filter elements 34, as shown in Figure 5. The outside rims 67 of the filter plates extend downward, and the inner rims 68 extend upward, but these inner and outer rims are preferably of the same height, and the body portion of the filter plate is constructed so that the upper edges of the rims 67 and 68 of each plate are on substantially the same level.

The filter elements 34 are of slightly larger diameter than the filter plates 22 and there is a central opening through each of the filter elements 34 of slightly smaller diameter than the cylindrical space enclosed by the inner rim 68 of each of the filter plates. When a filter element 34 is placed between two of the filter plates 22, with its axis coincident with the axis of the filter plates, and the plates are clamped together, the edges of the filter element 34 are firmly held between the adjacent outer rims 67 and inner rims 68 of the filter plates 22.

Fluid which enters the openings 32 flows across the top surface of the filter element 34, passes downward through the filter element, and through the spaces between the corrugations 70 of the plate that supports the filter element 34. The fluid flows out through the openings 72 in the rim 68 and into the chamber enclosed by the inner rims 68. The bottom backing-up plate 39 closes the lower end of the chamber at the center portion of the filter, but the outlet connection 26 opens through the upper plate 38 and permits the fluid to flow out of the filter unit.

It is important that each of the filter elements 34 be clamped securely around both its inner and outer edges when the filter element 34 is made of cloth, or other material that can be deformed downward into the spaces between corrugations 70, when the pressure forcing the fluid through the filter elements is of a considerable magnitude. If a cloth filter element is not firmly clamped around its edges, and does pull inward because of excessive sag into the spaces between the corrugations 70, there is a leak created between the portions of the adjacent filter plates from which the filter element pulls away. One of the advantages of this invention is that the backing-up plates 38 and 39 apply pressure to both the inner and outer rims of the filter plates and it is not necessary, that the filter plates themselves have sufficient stiffness to clamp the outer edges of the filter elements when the stack of plates is fastened together only at the center, as in constructions of the prior art.

Figure 5 shows the backing-up plates 38 and 39 fastened together at the center by stud bolts 24 and nuts 74, and fastened together around the outer edge of the filter unit by the bolts 41 and the wing nuts 43. Such a construction permits the application of high clamping pressure to the inner and outer rims of the filter plates for holding the filter elements in place in filter units that operate under high pressure. This construction also permits the use of lighter backing-up plates 38 and 39. It is usually sufficient, however, to have only the center tension elements 24 and nuts 74 for holding the filter unit in assembled relation, and with such construction the extending rim portions on the backing-up plates 38 and 39 with notches for receiving the bolts 41 are not necessary. The discs that comprise the backing-up plates 38 and 39 are rigid and capable of transmitting the axial pull of the tension elements 24 to the outer rims 67 of the filter plates. The filter elements 19 and 59, illustrated in Figures 1 and 4, respectively, do not have extended backing-up plates or peripheral clamping bolts 41. In the preferred embodiment of the invention there are three tension elements 24, this being the fewest that will center the filter plates, and these tension elements are located so that they are tangent to a circle that is substantially equal in radius to the center openings through the filter plates.

The filter unit can be made with clamping bolts 41 around its outside edge, and without any center clamping means such as the tension elements 24 and nuts 74. Constructions without the center clamping means provide a larger section of conduit for the discharge of liquid from the center portion of the filter unit.

In order to distribute the incoming fluid more evenly over the surface of the filter elements, the openings 32 in the outer rims 67 of the filter plates are provided with vanes 76. These vanes deflect the incoming fluid and tend to make it follow a spiral course toward the center of the filter unit. Two different constructions for the inlet openings are shown in the drawing. The openings 32, illustrated in Figures 1 to 5 and 8, are made by pressing in a generally semi-circular portion of the outside rim to form a tongue which serves as the vanes 76. With this construction no metal is removed and all of the metal displace from the opening is used as the vane 76, the construction being well illustrated in Figure 8.

Figures 7, 8, 9, 10, 11:
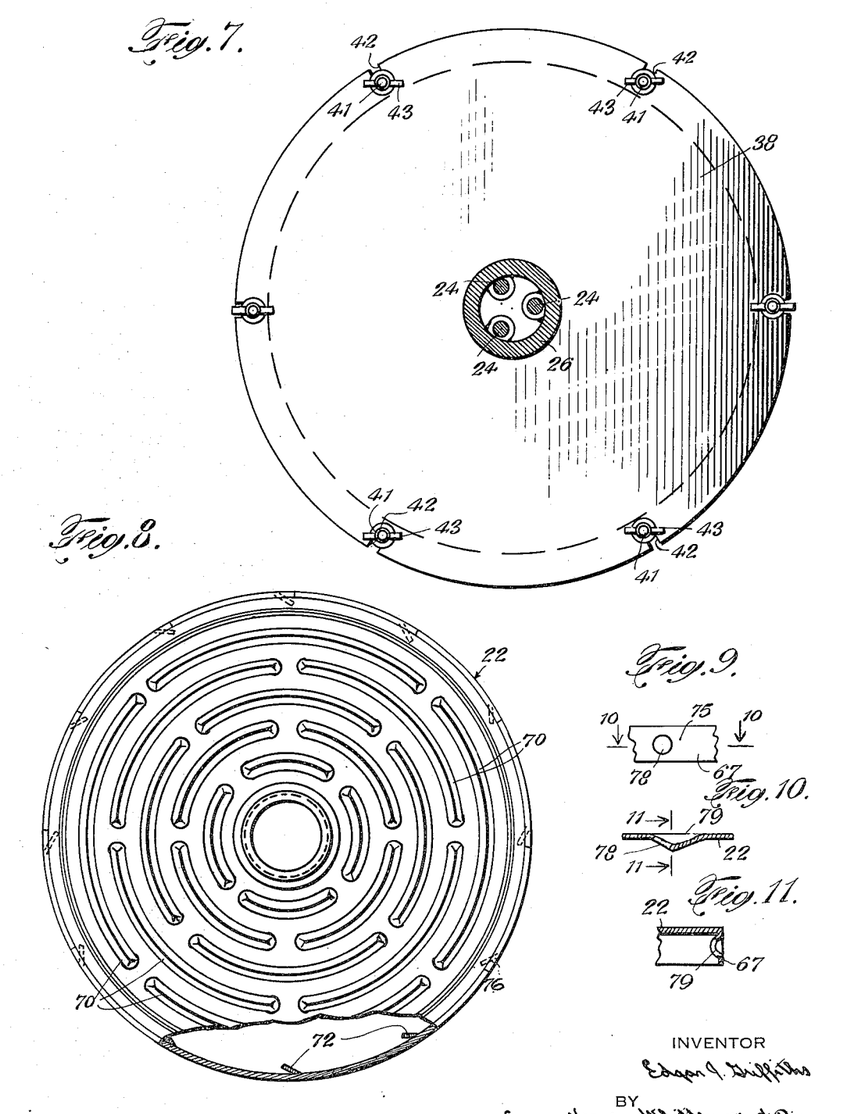
Figure 7 is a reduced, sectional view taken on the line 7—7 of Figure 5.
Figure 8 is a reduced top plan view of one of the filter plates of the units shown in Figures 1-5.
Figure 9 is a fragmentary side elevation of the outside rim of a filter plate with a modified form of opening for admitting fluid into the filter unit.
Figure 10 is a sectional view taken on the line 10—10 of Figure 9.
Figure 11 is a sectional view taken on the line 11—11 of Figure 10.

Figures 9 to 11 show another form of opening in which metal is removed from the outer flange 67 by punching an opening, preferably a circular opening 78, through the flange of the filter plate. The metal at one side of the opening 78 is then bent inward to form a corrugation 79 that serves as the vane to produce a generally spiral direction of fluid flow into the filter.

Figures 12, 13, 14:
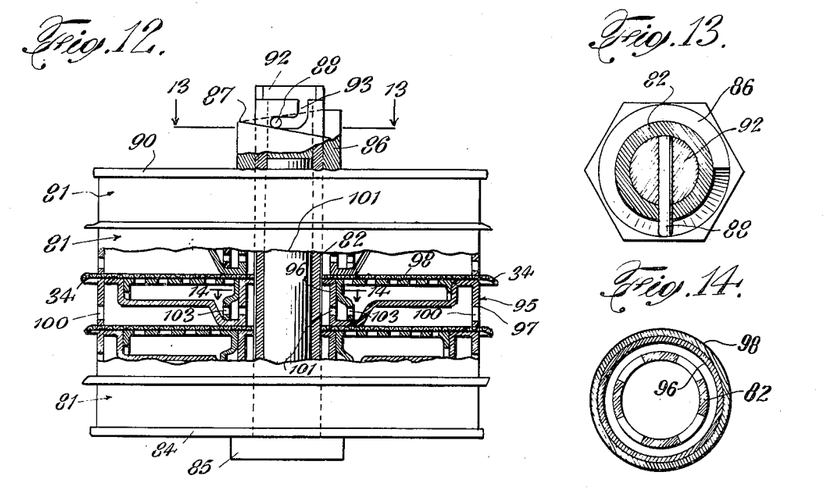
Figure 12 is a side elevation, partly in section, showing a modified form of filter with the plates clamped together without the use of screw threads.
Figure 13 is a sectional view taken on the line 13—13 of Figure 12.
Figure 14 is a sectional view taken on the line 14—14 of Figure 12.

Figure 12 shows a construction in which a stack of filter plates 81 surround a standpipe 82. A rigid plate 84, under the bottom filter plate 81, rests on a shouldered fitting 85 at the lower end of the standpipe 82.

The plates are clamped by a collar 86 that fits freely over the upper end of the standpipe and that has a cam surface 87 on its top face. This cam surface 87 reacts against a plug fitting with a stud 88 thereon. This stud extends through the side of the standpipe. The stud 88 can be designed to extend through the standpipe on both sides, and the cam face 87 can be made with two inclined sections for cooperation with such a pin 88 extending through both sides of the standpipe.

In the preferred construction, illustrated in Figure 12, the stud 88 extends through only one side of the standpipe and the cam face 87 is a single slope around the entire circumference of the top face of the collar 86. This construction has the advantage that it obtains a larger cam throw with a slope that is gradual enough to make the cam means irreversible. The collar 86 is of non-circular cross section, a hexagonal shape being shown in the drawing, or flats on the sides of the collar can be provided, so that the collar can be rotated by a wrench or a special tool. As the collar 86 turns in one direction the cam face 87 forces the collar downward against a rigid plate 90 that covers the top filter plate 81 and clamps the filter plates firmly together. The incline of the cam face 87 is so gradual that friction of the pin 88 against the cam face is sufficient to cause the collar 86 to remain in any clamped position.

In the construction illustrated, the stud 88 extends from the sides of a plug 92 which closes the upper end of the standpipe 82 and is held in place by bayonet type slot 93 in the upper end of the standpipe. This bayonet type slot 93 has rest stops at its end so that the stud 88 can resist the thrust of the cam face 87 without danger of displacing the stud 88 in the slot 93.

The reason for having the plug 92 removable is to make it possible to clean the inside of the standpipe more easily by avoiding inaccessible corners such as would be present in the upper end of the standpipe if the plug 92 were not removable. All of the clamping elements including the collar 86, pin 88 and plug 92 are easily cleaned when the filter is disassembled.

The filter plates 81 are of a different construction from those illustrated in the previous views of the drawing. This modified plate construction includes a two-piece construction in which there is a lower plate element 95 with an inner flange 96 and outer flange 97. The filter pads 34 are clamped between these flanges and the corresponding flanges of the next filter plate above and below in the same manner as in Figure 5.

The lower plate element 95 in Figure 12 is not provided with any ridges for supporting the filter pad 34. In place of ridges, an upper plate element 98 is employed. This upper plate element is perforated and is shaped to fit the lower plate element 95 in such a way that it is held in place by at least one, and preferably both, of the flanges of the lower plate element.

There are openings 100 in the down-turned outer flange 97, and openings 101 in the upturned inner flange 96 for passage of fluid to and from the spaces above and below the filter pad. The upper plate element 98 is made with as much open area as possible while maintaining the necessary strength for this upper plate element 98 which must support the filter pad against the pressure head required to force fluid through the pad at a predetermined rate. In the construction shown in Figure 12, the upper plate element 98 has down-turned flanges by which it is supported from the lower plate element 95, and the inner of these flanges is provided with openings 103 for passage of fluid.

Figure 15:
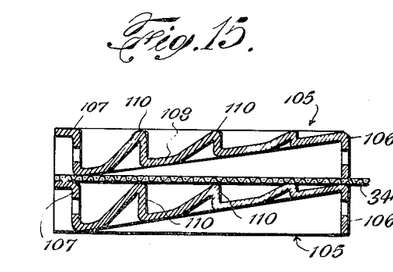
Figure 15 is a sectional view through a portion of a filter having a modified form of plate for clamping the filter pads.

Figure 15 shows a construction in which filter plates 105 have outer flanges 106 and inner flanges 107, but have these flanges connected by a body portion 108 which slopes in such a way that the space above and below the filter pad 34 changes in cross section in proportion to the change in the volume of the fluid passing through the space. For example, all of the fluid flowing into the space above the filter 34 passes over the area of the filter immediately adjacent the flange 106.

As the fluid moves radially inward, some of it passes down through the filter pad 34, so that the volume of the fluid in the space between the filter pad 34 and the under side of the upper plate 105 decreases progressively. Conversely, the volume of fluid under the pad 34 becomes greater and greater as the fluid under the pad moves toward the inner flange 107. There are arcuate ridges 110 formed in the body portions 108 of the plates 105 and these ridges 110 are of different heights along the sloping surface of the filter plates 105 so that the pad 34 which is supported by the ridges 110 is maintained substantially level. The advantage of this construction is that the space between the filter plates 105 can be made smaller without increasing the pressure drop as compared with filters that do not have a varying cross section.

The ridges 110 are made with a buttress section instead of the round section shown in Figure 5. The purpose of this buttress section in the filter plates 105 of Figure 15 is to obtain a sharper ridge. When the filter plates are in use there is some sagging of the filter pads 34 across the space between the supporting ridges 110 and the area of the filter pad through which liquid can pass is reduced by contact of the filter pad with the surfaces of the supporting ridges. By having the supporting ridges shaped so that they are sharper at their upper ends, less area of the filter pad is rendered ineffective by any given amount of sagging of the pad. On the other hand there is a limit how sharp the ridges can be made if the plates are to be pressed. The buttress construction shown in Figure 15 is advantageous because it obtains a comparatively sharp ridge and still provides a shape suitable for pressing.

Figure 16:
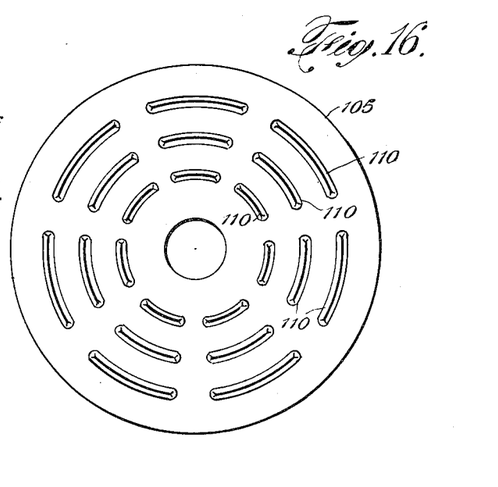
Figure 16 is a top plan view of one of the plates shown in Figure 15.

Figure 16 shows a plan view of one of the plates 105 of Figure 15. Ridges 110 are in such relation to one another that there are radial passages between adjacent ends of the different ridge sections 110 from the periphery of the plate to the center opening. This construction permits a freer flow of liquid across the face of the plate than does the staggered ridge construction of Figure 8, and provides enough support for the filter pad if the pressure at which the filter operates is not too high.

Figure 17:
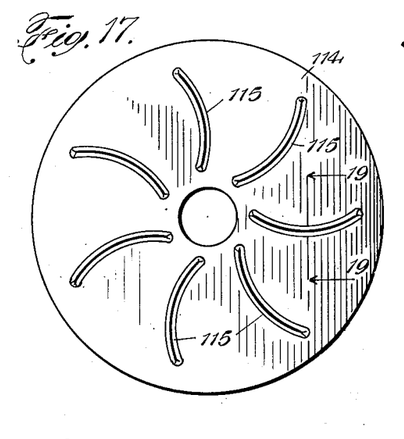
Figures 17 and 18 are top plan views showing other modified forms of plates for supporting and clamping the filter pads.

Another plate construction for reducing the obstruction to liquid flow is shown in Figure 17. This figure shows a plate 114 with spiral ridges 115 that hold the filter pad away from the body of the plate without obstructing the radial flow of the liquid toward the center opening. In order to provide for better distribution of the liquid across the area of the filter pad, the ridges 115 of Figure 17 are given a slight spiral pitch. This type of plate is useful for filters that operate under lower pressure than the filters with which the plates of Figures 8 and 16 are used, but more ridges 115, that is, ridges at closer spacing, can be employed with the plate of the type shown in Figure 17 if the filter is to be used for higher pressure.

Figures 18, 20:
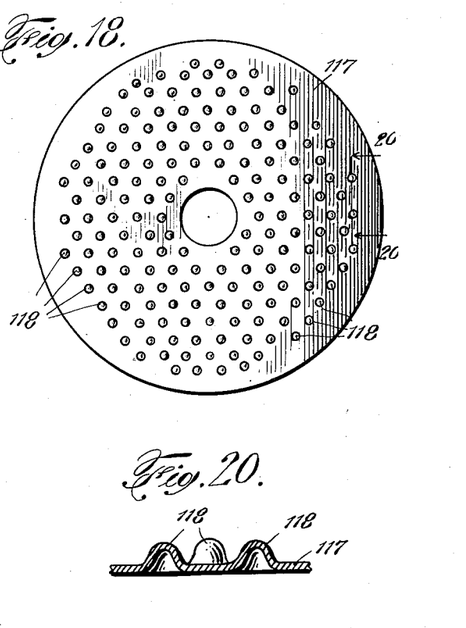
Figures 19 and 20 are enlarged sectional views taken on the lines 19—19 and 20—20 of Figures 17 and 18 respectively.
Figure 19:
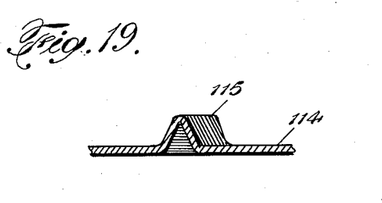

Figure 18 shows another modified plate construction in which a plate 117 is provided with a plurality of nodules 118 that hold the filter pad spaced from the body of the plate at a multitude of spaced locations over the area of the plate.

Figure 21:
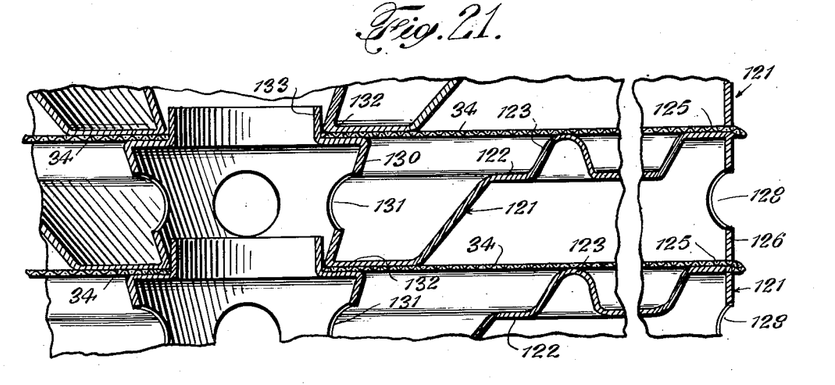
Figure 21 is an enlarged sectional view, partly broken away, showing another modified form of plate construction in which the plates nest for the purpose of aligning them with one another.

Figure 21 shows a special type of plate construction in which the inner rims of the plates nest so that the filter assembly requires no standpipe. In this construction each of the plates 121 has a body portion 122 in which there are supporting ridges 123 for holding the filter pad 34 spaced from the body portion of the plate. The plate 121 has a peripheral portion including a face 125 and a downturned rim 126 that clamps the filter pad 34 against the face 125 of the next plate below. There are openings 128 for the entrance of fluid into the space between each filter plate 121 and the pad 34 below the filter plate. This construction is similar to that shown for the other forms of filter plate illustrated in the other figures of the drawing.

The novel construction of each of the filter plates 121 is at the inner portion around the central opening through the filter plate. The inner portion of the body 122 extends down to a level approximately the same as that of the lower end of the rim 126, and then turns upward to form an inner rim 130 that slopes outward away from the central axis of the plate. The inner rim 130 has openings 131 for the flow of fluid into the central opening through the filter plates.

The inner rim 130 extends upward and then turns inward at approximately the level of the face 125 to form a clamping face 132 against which the filter pad 34 is clamped by the bottom of the next filter plate above. The face 132 extends inward and merges with an upturned centering rim 133 that forms the upper end of the rim 130. The construction is such that the outside diameter of the centering rim 133 is approximately equal to, or slightly less than, the center opening in the plate at the bottom level of the plate. With this construction any number of plates can be nested, as shown in Figure 21, to obtain a filter unit in which the plates are maintained in axial alignment without the use of a standpipe.

In order to obtain clamping pressure against the filter pads 34 it is necessary that the plates 121 be held together, but such clamping pressure can be obtained by tension members around the periphery of the plate assembly, as in the construction shown in Figure 5, or by a tie rod extending through the center of the stack of plates. The centering rims 133 not only serve to center the respective plates with the next plate above, but also serve to center the filter pads 34 when they are laid on the plates during assembly of the unit. This nested construction permits the plates and filters to be assembled very quickly after cleaning.

Figure 22:
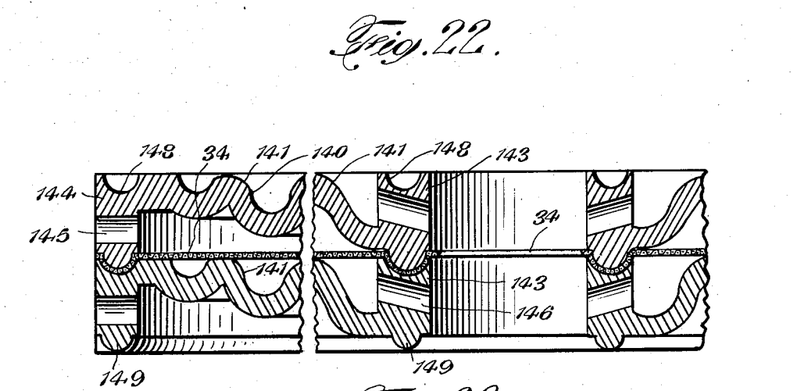
Figure 22 is an enlarged sectional view taken on the line 22—22 of Figure 23, part of the intermediate structure of the body portion being broken out in order to increase the scale of the drawing.
Figure 23:
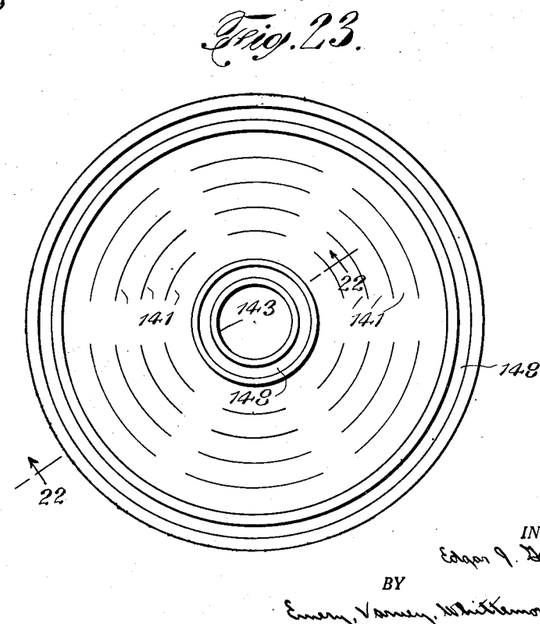
Figure 23 is a reduced scale, top plan view of another modified form of the invention in which both the inner and outer rims of the plate are formed so as to nest with the next adjacent plate.

Figures 22 and 23 show another modified form of the invention constructed in such a way that both the inner and peripheral rims of the plate nest and maintain adjacent plates centralized without the use of a standpipe or equivalent structure. Each plate has a body portion 140 which preferably slopes downward toward the center, as in the construction shown in Figure 15, and which has supporting ridges 141 for holding the filter pad 34 out of contact with the intermediate surface of the body portion 140.

There is an inner rim 143 which extends upward from the body portion 140, and a peripheral rim 144 which extends downward from the outer edge of the body portion 140. Fluid to be filtered enters the space above the filter pad through openings 145 in the peripheral rim 144. The filtered liquid passes from the space below the filter pad 34 through openings 146 in the inner rim 143.

Each of the rims 143 and 144 has an annular recess 148 in its top face, and a complementary annular ridge 149 projecting from the bottom face of the rim. The recesses 148 and the ridges 149 are shown with generally arcuate contour, but other shapes can be employed. The ridges 149 nest within the recesses 148 of the next adjacent plate and press the edges of the filter pad 34 downward into these recesses. This not only serves to draw the filter pad tight across the body portion of the plate, but also increase the clamping area by which the filter pad is held.

The illustrated embodiments of the invention are shown with the filter units employed for liquid, but it will be understood that most features of the invention are equally applicable to filters for air or other gases. Terms of orientation, such as "upturned" and "downturned," are, of course, relative. Parts can be reversed and various other changes and modifications can be made in the constructions illustrated, and some features can be used without others without departing from the invention.

I claim as my invention:

A filter including a stack of flexible annular plates disposed about a standpipe, each of said plates having an inner and an outer rim for clamping filter elements between the plates, openings in the rims for passage of liquid, said openings being at locations which place the filter elements in parallel circuits, a shoulder at one end of the standpipe in position to hold one of the rigid plates against the stack, a collar surrounding the other end of the standpipe beyond the other rigid plate, said other end of the standpipe being smooth and unthreaded and the collar being rotatable on the smooth surface of the standpipe as a bearing, the collar having a longitudinal face at one end in contact with the rigid plate at the adjacent end of the stack, and said collar having a sloping longitudinal face at its other end, a plug closing the smooth interior at the end of the standpipe nearest to the collar, a stud extending from the plug through a bayonet slot in the standpipe, said stud extending beyond the plug for a distance substantially greater than the thickness of the standpipe wall so that the end portion of the plug extends beyond the smooth surface of the standpipe and into position to provide an abutment against which the sloping surface of the collar reacts to exert an axial thrust against the rigid plate when the collar is rotated about the axis of the standpipe.

EDGAR J. GRIFFITHS.

REFERENCES CITED

The following references are of record in the file of this patent:

UNITED STATES PATENTS

| Number | Name | Date |
|---|---|---|
| 612,105 | Hendrick | Oct. 11, 1898 |
| 685,224 | Schmidt | Oct. 22, 1901 |
| 793,725 | Johnson | July 4, 1905 |
| 837,845 | Kiefer | Dec. 4, 1906 |
| 984,705 | Rarick | Feb. 21, 1911 |
| 1,035,248 | Seavey | Aug. 13, 1912 |
| 1,061,928 | Seavey | May 13, 1913 |
| 1,150,910 | Warmington | Aug. 24, 1915 |
| 1,295,006 | Corey | Feb. 18, 1919 |
| 1,759,447 | Fisher | May 20, 1930 |
| 1,945,824 | Saxe | Feb. 6, 1934 |
| 2,059,636 | Flavin et al. | Nov. 3, 1936 |
| 2,154,565 | Fife | Apr. 18, 1939 |
| 2,178,964 | Hulse | Nov. 7, 1939 |
| 2,278,453 | Kracklauer | Apr. 7, 1942 |
| 2,334,448 | Sheridan | Nov. 16, 1943 |
| 2,345,014 | Stamsvik | Mar. 28, 1944 |
| 2,359,475 | Gauthier | Oct. 3, 1944 |

FOREIGN PATENTS

| Number | Country | Date |
|---|---|---|
| 2,931 | Great Britain | of 1897 |
| 22,409 | Great Britain | Nov. 6, 1901 |
| 412,100 | Great Britain | June 21, 1934 |
| 30,891 | France (1st Add. to 608,657) | |
| 586,193 | France | Mar. 16, 1925 |